(12) United States Patent
Cleereman et al.

(10) Patent No.: US 7,212,391 B2
(45) Date of Patent: May 1, 2007

(54) GROUNDED ISOLATION SYSTEM

(75) Inventors: Douglas P. Cleereman, Greendale, WI (US); William J. Mayer, Hales Corners, WI (US); David S. Fisher, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 255 days.

(21) Appl. No.: 10/153,075

(22) Filed: May 22, 2002

(65) Prior Publication Data
US 2002/0136161 A1  Sep. 26, 2002

Related U.S. Application Data

(63) Continuation-in-part of application No. 09/407,475, filed on Sep. 28, 1999, now Pat. No. 6,937,450.

(51) Int. Cl.
*H02H 3/00* (2006.01)
(52) U.S. Cl. .......................... 361/170; 361/42
(58) Field of Classification Search ........... 361/42–50, 361/166, 187, 189, 31, 33, 170; 318/757, 318/763
See application file for complete search history.

(56) References Cited

U.S. PATENT DOCUMENTS

| | | | | |
|---|---|---|---|---|
| 2,162,516 A | * | 6/1939 | Parsons | 361/59 |
| 3,840,783 A | * | 10/1974 | Eckart | 361/47 |
| 4,153,923 A | * | 5/1979 | Graf | 361/48 |
| 4,184,186 A | * | 1/1980 | Barkan | 361/10 |
| 4,368,498 A | * | 1/1983 | Neuhouser | 361/48 |
| 4,375,660 A | * | 3/1983 | Tate et al. | 361/50 |
| 4,737,603 A | * | 4/1988 | Lycan | 200/18 |
| 4,996,469 A | * | 2/1991 | DeLange et al. | 318/757 |
| 5,283,708 A | * | 2/1994 | Waltz | 361/93.8 |
| 5,309,109 A | * | 5/1994 | Miyazaki et al. | 324/509 |
| 5,689,398 A | | 11/1997 | Miller et al. | |
| 6,108,179 A | * | 8/2000 | Katae et al. | 361/31 |
| 6,437,951 B1 | * | 8/2002 | Ahlstrom et al. | 361/42 |
| 6,548,980 B1 | * | 4/2003 | Sakuma et al. | 318/482 |

* cited by examiner

*Primary Examiner*—Brian Sircus
*Assistant Examiner*—Danny Nguyen
(74) *Attorney, Agent, or Firm*—Keith M. Baxter; Alexander M. Gerasimow

(57) ABSTRACT

An system and method are disclosed for isolating and grounding a load device, where grounding only occurs after the voltage(s) on the load device have been reduced to acceptable levels. The system includes power and grounding contacts, a sensing device, and a control device. The power contact determines whether a power line is coupled to a terminal of the load. The grounding contact determines whether the terminal is coupled to ground. The sensing device is coupled to the terminal, and the control device communicates with the contacts and sensing device. Upon a signal being provided to the control device, the control device causes the power contact to decouple the terminal from the power line and, upon the sensing device determining that a condition has been met concerning the terminal, the control device causes the grounding contact to couple the terminal with ground and a system indication light to be illuminated.

19 Claims, 5 Drawing Sheets

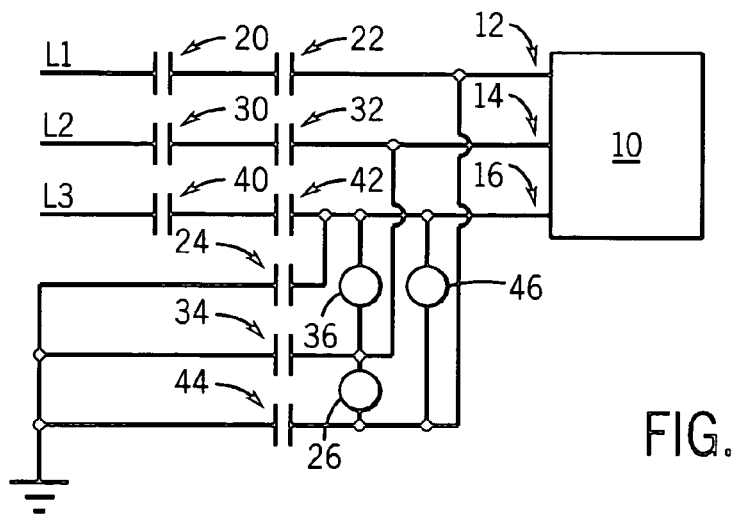
FIG. 1
FIG. 6
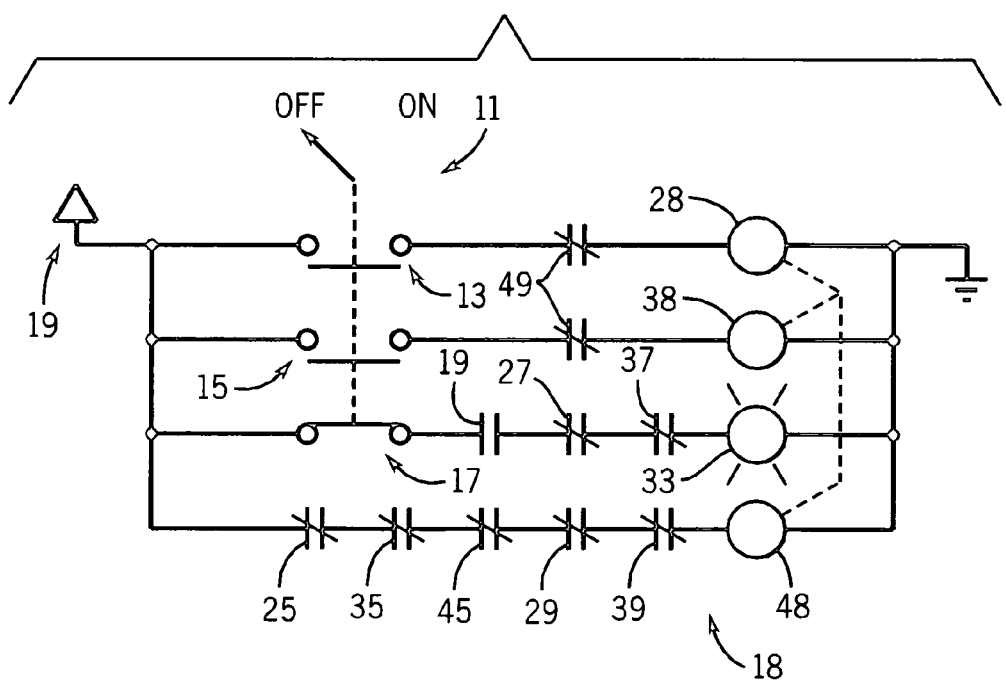
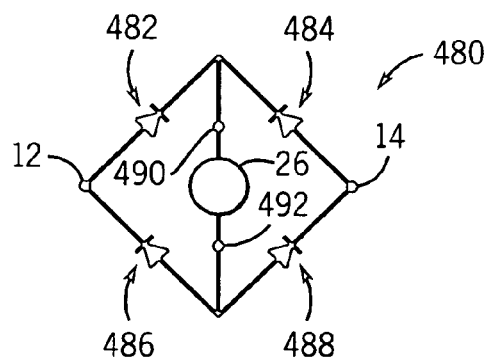

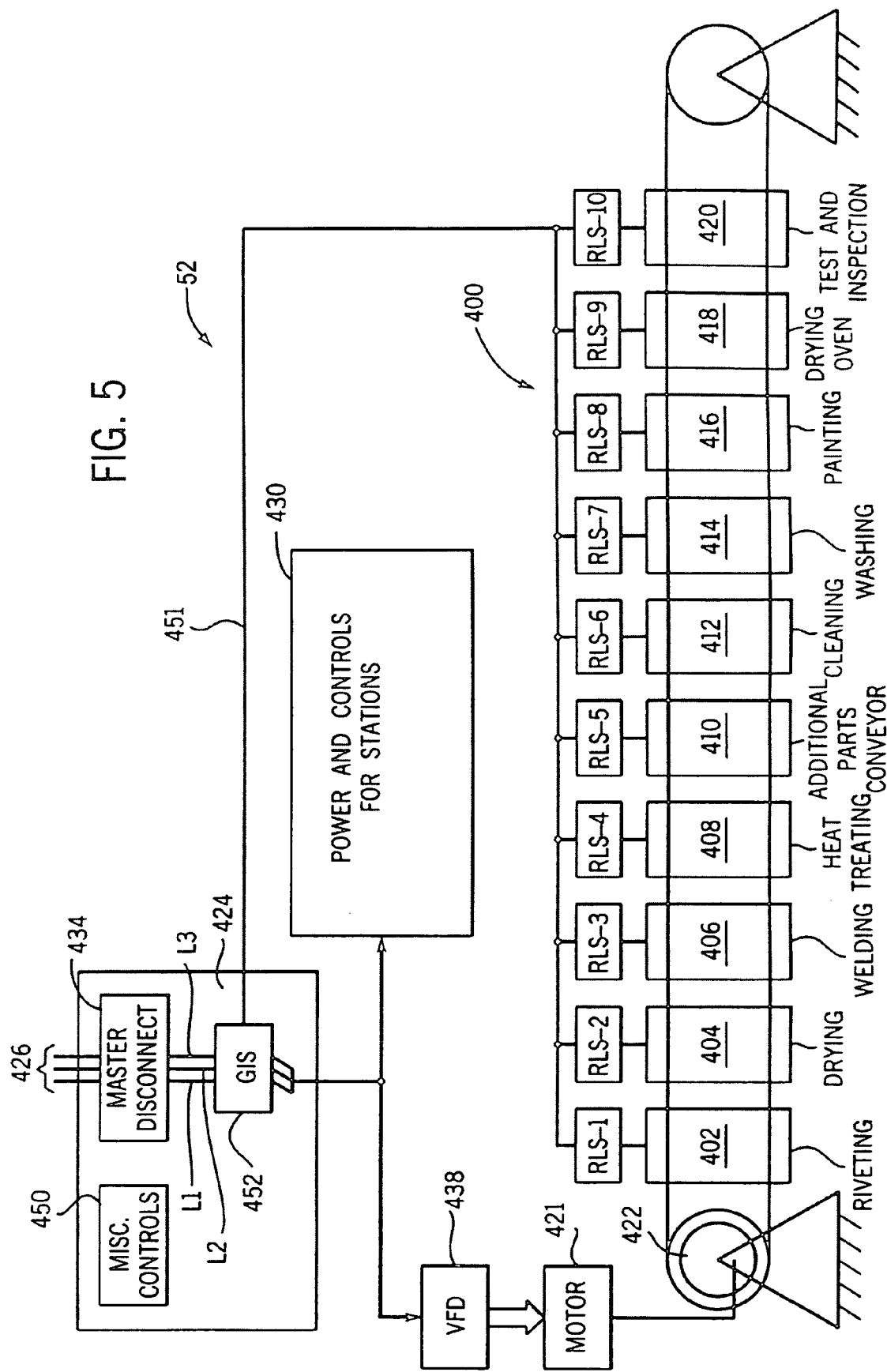

US 7,212,391 B2

GROUNDED ISOLATION SYSTEM

CROSS-REFERENCE TO RELATED APPLICATIONS

This application is a continuation-in-part-of, and claims the benefit of U.S. patent application Ser. No. 09/407,475, which is entitled "Grounded Isolation System" and was filed on Sep. 28, 1999 now U.S. Pat. No. 6,937,450.

STATEMENT REGARDING FEDERALLY SPONSORED RESEARCH OR DEVELOPMENT

Not applicable

FIELD OF THE INVENTION

The present invention relates to isolation systems for electrically isolating access points on a machine. In particular, the present invention relates to an isolation configuration that employs coils and switches to isolate and ground a load on an electrical system during lock-out conditions.

BACKGROUND OF THE INVENTION

An exemplary automated manufacturing line may include several hundred electrically powered devices arranged in device sets at separate manufacturing stations, a separate manufacturing process performed by each device at each station. For example, the devices may include robots, drills, mills, transfer lines, clamps, mixing machines, stuffing machines, drying machines and so on, each of which is linked to one or more loads such as motors for driving the devices through required movements and processes.

When designing a manufacturing or processing line one of the primary considerations is line safety as many of the devices at each line station may inflict injury to an operator in the station vicinity. Typical injuries including mechanical injury (e.g., falling, crushing, puncture, etc.). For this reason many stations, and in some cases all stations, will be enclosed in a housing assembly to ensure that an operator does not inadvertently enter a potentially hazardous station environment. Hereinafter an exemplary enclosure will be referred to as a station and the station or device grouping therein will sometimes be referred to as a hazard to indicate the potential danger associated therewith.

Despite painstaking design of the processing line stations and of the control method associated therewith, often processing problems can occur which require operator intervention to alleviate the problems. To facilitate operator intervention, typically line access points are provided. To ensure that an operator entering a station via an access point is not injured, standard practice within the industry requires that power to the station be entirely cut off via a power down mechanism. By cutting off power to the station, all station devices cease mechanical movement and the possibility of injury is essentially eliminated.

In copending U.S. patent application Ser. No. 09/407,475, of which the present patent application is a continuation-in-part, and which is incorporated by reference herein, a new system for disconnecting manufacturing stations (and their respective devices/loads) from power is described. The system, which is again described below with reference to FIG. 2, operates to disconnect manufacturing stations from power in two ways. First, the manufacturing stations are electrically isolated (e.g., disconnected) from the power source itself. Second, the manufacturing stations are then connected to ground. The coupling of the manufacturing stations to ground ensures that no power is provided to those stations.

While this system for electrically isolating and grounding manufacturing stations is an advance over other systems, the grounding of the manufacturing stations can have deleterious effects under certain operational circumstances. For example, certain devices/loads such as variable frequency drives can experience regenerative braking upon being disconnected from the power source. If the terminals on the variable frequency drives are immediately coupled to ground upon being disconnected from power, the sudden changes in voltages and currents experienced at the terminals and within the drives can cause damage to the drives. Consequently, it would be advantageous if a new system for electrically isolating and grounding manufacturing stations could be developed that avoided causing the deleterious effects to manufacturing station loads that otherwise can occur upon the grounding of those loads.

BRIEF SUMMARY OF THE INVENTION

The present inventors have realized that the negative consequences of grounding manufacturing station loads after those loads have been disconnected from power occur because the magnitudes of the voltages at the terminals of the loads are still significant when the terminals are coupled to ground. The inventors have further realized that these negative consequences can be alleviated by delaying the grounding of the load terminals after the disconnection of those terminals from power until such time as the magnitudes of the voltages at those terminals are reduced to a tolerable level.

In one embodiment, this delay is created by coupling one or more sensing coils between terminals of the load. The sensing coils, which remain energized so long as the magnitudes of the voltages at the terminals remain above a certain threshold, when deenergized cause respective normally-closed contacts to close. The normally-closed contacts are in series with a grounding coil that, when energized, causes the load terminals to be grounded. Consequently, it is only when the magnitudes of the voltages at the load terminals fall below the threshold such that the sensing coils are deenergized (and assuming that the load indeed is disconnected from power) that the load terminals become grounded.

In particular, the present invention relates to a system for coupling a load to a ground. The system includes a first power contact, a first grounding contact, a first sensing device, and a control device. The first power contact determines whether a first power line is coupled to a first terminal of the load. The first grounding contact determines whether the first terminal of the load is coupled to the ground. The first sensing device is coupled to the first terminal, and the control device is in communication with the first power and grounding contacts and the first sensing device. Upon a first signal being provided to the control device, the control device causes the first power contact to decouple the first terminal from the first power line and, upon the first sensing device determining that a first condition has been met with respect to at least the first terminal, the control device causes the first grounding contact to couple the first terminal with the ground.

The present invention further relates to a system for decoupling first, second, and third terminals of a load from first, second and third power lines and then coupling the first, second and third terminals to a ground, where the coupling of the first, second and third terminals to the ground is delayed until voltage levels at those terminals meet a predetermined condition. The system includes first, second and third power contacts coupling the first, second and third terminals of the load with the first, second and third power lines, respectively. The system additionally includes first, second and third grounding contacts coupling the first, second and third terminals of the load with the ground. The system further includes sensing means for sensing the predetermined condition, and control means for controlling the status of the power contacts and the grounding contacts, where the control means is coupled to the sensing means, the power contact and the grounding contacts. The control means causes the power contacts to decouple the first, second and third terminals of the load from the first, second and third power lines, respectively, in response to receiving a first signal at a first time, and the control means causes the grounding contacts to couple the first, second and third terminals of the load with the ground at a second time following the first time in response to the sensing means sensing the predetermined condition.

The present invention additionally relates to a method of controlling the decoupling of a power line from a load and coupling that load to a ground in order to isolate and ground the load. The method includes receiving a command to decouple the load from the power line, opening a first contact between the power line and the load so that the power line is decoupled from the load, and determining that a first condition concerning a status of the load is met. The method further includes, upon determining that the first condition has been met, closing a second contact between the load and the ground so as to ground the load.

BRIEF DESCRIPTION OF THE SEVERAL VIEWS OF THE DRAWINGS

FIG. 1 is a schematic diagram showing an embodiment of the present invention in simplified form;

FIG. 5 is a schematic diagram of a manufacturing line in which the grounding isolation systems such as those of FIGS. 1, 2 and 4 can be implemented.

FIG. 6 is a schematic diagram showing an alternate embodiment of a sensing device.

DETAILED DESCRIPTION OF THE INVENTION

Figure 2:
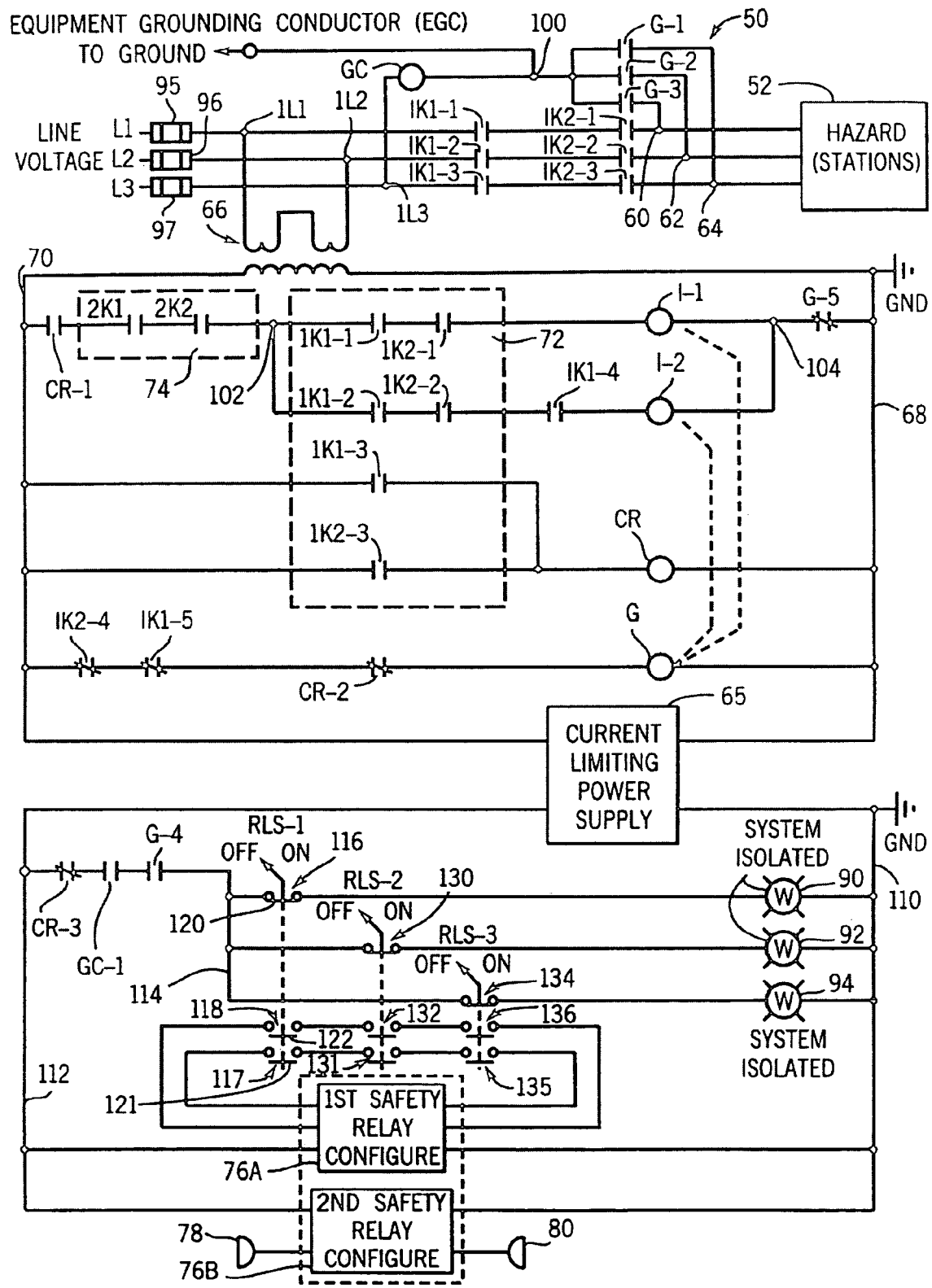
FIG. 2 is a schematic diagram illustrating a grounding isolation system.

Referring now to the drawings and, specifically, referring to FIG. 5, the present invention will be described in the context of an exemplary manufacturing line 400. The line 400 includes ten stations 402, 404, 406, 408, 410, 412, 414, 416, 418 and 420 spaced along the length of a conveyor 422 for performing various sub-processes on work items moved therealong. A motor which drives conveyor 422 is powered by a variable frequency drive 438 or other controls. Power and controls for stations 402 through 420 are collectively identified by numeral 430. A main or master control panel 424 receives power on three supply lines collectively identified by numeral 426 and provides power to line components which require power. Panel 424 includes miscellaneous panel control 450, a main or master disconnect switch 434 and a ground isolation system (GIS) 452. Main disconnect 434 links supply lines 426 to GIS 452, with power being provided to GIS 452 via lines L1, L2 and L3. GIS 452 links lines L1, L2 and L3 to each of VFD 438 and controls 430.

Referring to FIG. 5 and additionally to FIG. 2, collectively VFD 438, controls 430 and hardware controlled thereby are referred to as a hazard 52. Thus, hazard 52 includes a manufacturing line which has a plurality of stations, each station having a plurality of different devices which cooperate to perform some tasks on a work item. For example, the devices may include motors, drills, mills, gluing, cooking, riveting, welding, drying, stirring, painting, cleaning, members, etc. Also, each station 402 through 420 includes a station distinct remote lock-out switch (RLS) RLS-1, RLS-2, RLS-3, RLS-4, RLS-5, RLS-6, RLS-7, RLS-8, RLS-9 and RLS-10, respectively. GIS 452 and RLSs 1 through 10 will collectively be referred to as an electrical isolation system 50.

Referring still to FIGS. 2 and 5, as described above, hazard 52 is linked via exemplary and inventive isolation system 50 to the three voltage supply lines L1, L2, and L3. When an operator elects to link lines L1, L2 and L3 to intermediate nodes 60, 62 and 64 voltage is provided to hazard 52. Hereafter it will be assumed that a motor at one particular station 402 is for moving a rivet gun into a position to rivet two pieces of sheet metal together.

System Hardware

Electrical isolation system 50 includes a plurality of components which cooperate to enable a user to either provide power to hazard 52 or, in the alternative, to cut off power to hazard 52 and ground intermediate nodes 60, 62 and 64 (see FIG. 2). When nodes 60, 62 and 64 are grounded, an operator may access any of the stations associated with hazard 52 via access locations after a lockout-tagout operation has been performed to ensure that power is not again provided to the specific station. To verify that power at a specific station has been cut off, indicators, preferably in the form of lights (e.g., see 90 in FIG. 2), are provided proximate each access location. When an access location light is lit, it is safe to enter the corresponding station. Similarly, when an access location light is not lit, the inventive system has identified an unsafe condition and the operator should not enter the station.

To facilitate the aforementioned functions, system 50 includes a plurality of relays, switches, fuses and indicator lights. A relay is a device which includes at least one coil and an associated contact. A contact is essentially a two stage switch having a normal state (i.e., open or closed) and an excited state (i.e., the opposite of the normal state). A contact having a normally closed state is referred to as an NC contact while a contact having a normally open state is referred to as an NO contact. When current passes through the coil, the relay changes contact states. Thus, when the coil is energized, the NC contacts open and NO contacts close. In many cases, a relay will include more than a single contact. For example, a relay may include three NO contacts and one NC contact or five NO contacts and one NC contact. In a relay having three NO contacts and one NC contact, when the coil is energized, all three NO contacts close and the NC contact opens. With a relay, when a NO contact is welded closed, corresponding NC contacts cannot close and vice versa. This type of relay is referred to as a positively guided or mechanically linked relay.

As well known in the art, relays can be combined in specific configurations to perform specific tasks. One special type of relay configuration is generally referred to as a safety relay configuration. A safety relay configuration typically includes, among other things, one or more relays, one or more NC emergency stop (ES) switch inputs, a start switch input and logic power source inputs. Typical configurations include both a control circuit or a safety relay circuit and at least one output. The safety relay circuit is designed to effectively "determine" whether or not an operator wants power to be delivered to a device (e.g., a motor, another coil, etc.) based on a recent sequence of start and stop commands selected via start and ES switches.

The output is designed to either provide power to, or cut power off from, the device based on operation of the safety relay circuit inputs. To this end, an output typically includes two or more relay contacts (hereinafter "output contacts") in series between a driving voltage source and the device, each of the output contacts having to be closed to provide power to the device.

The safety relay circuit is designed such that, when the start switch is closed, the relay coils are energized causing the output contacts to close (thereby providing power to the device). The ES switches are arranged such that when the ES switches are opened, coil current is cut off and all properly operating contacts associated therewith change state (i.e., closed contacts open and open contacts close). Thus, when the ES switches are open the output contacts open and power to the motor is cut off. After power is cut off, assuming properly operating contacts, power can again be provided by closing the start switch.

Referring still to FIG. 2, among other things, system 50 includes a safety relay circuit which includes a start button or switch 78, and an ES switch 80 and first and second relay configurations 76A and 76B, respectively. Switches 78 and 80 are linked to second configuration 76B. When the proper sequence of switches 78 and 80 is performed, output contacts associated with configuration 76B are all closed.

With respect to a first safety relay configuration 76A, although not illustrated, the first configuration includes circuitry which monitors the integrity of cables which link remote lock-out switches to the safety relay control circuitry. To this end, the first safety relay configuration includes two relays which are arranged in a manner similar to the configuration described above. In FIG. 2, output contacts corresponding to first safety relay configuration 76A are collectively specified by box 72. Output contacts corresponding to the first relay in the first configuration are identified by references IK1-m where m indicates a relay specific contact (i.e. m=1, 2 or 3) while contacts corresponding to the second relay in the first configuration 76A are each identified by references 1K2-m where m again specifies a relay specific contact. Thus, each of the relays in the first safety relay configuration 76A include six NO contacts in box 72.

With respect to second safety relay configuration 76B, although not illustrated, the second configuration includes circuitry which monitors switches 78 and 80 to determine when power should be provided to and cut off from hazard 52. Essentially second configuration 76B facilitates starting and emergency stop functions. To this end the second safety relay configuration 76B also includes two relays arranged in a manner similar to the configuration described above. In FIG. 2, the output contacts corresponding to second safety relay configuration 76B are collectively specified by box 74. Output contacts 2K1 and 2K2 in box 74 correspond to the first and second relays in the second relay configuration 76B, respectively (i.e. each of the second configuration relays only include a single NO output contact).

Referring still to FIG. 2, generally, the components of system 50 form a control configuration, a controller for controlling the control configuration and a grounding configuration. In addition to the contacts in safety relay boxes 72 and 74, the control configuration includes first and second isolation contactors and a control relay. A contactor is similar to a relay in that it has some combination of related NO and NC contacts and a coil. The difference between a relay and a contactor is that the contactor is designed to handle power while the relay is designed to handle logic level signals. The first isolation contactor includes four NO contacts IK1-1, IK1-2, IK1-3, and IK1-4, one NC contact IK1-5, and a first isolation coil I-1. Similarly, the second isolation relay includes three NO contacts IK2-1, IK2-2 and IK2-3, one NC contact IK2-4, and a second isolation coil I-2. The control relay includes one NO contact CR-1, two NC contacts CR-2 and CR-3 and a control relay coil CR.

The grounding configuration includes a ground contactor and a ground control relay. The ground contactor includes four NO contacts G-1, G-2, G-3 and G-4, one NC contact G-5, and a ground coil G. The ground control relay includes a single NO contact GC-1, and a ground control coil GC.

In addition to safety relay circuits 76 and switches 78 and 80, the controller includes remote lockout switches and system isolation indicators. Referring to FIG. 5, because line 400 includes ten stations, ten RLSs and corresponding indicators are provided. Nevertheless, referring to FIG. 2, to simplify this explanation only three RLSs, RLS1, RLS2 and RLS3, are illustrated along with corresponding indicators 90, 92 and 94. Indicators 90, 92 and 94 are preferably lights. In addition to the components described above, system 50 also includes a current limiting power supply 65, fuses 95, 96 and 97 and a transformer 66.

Referring still to FIG. 2, the above-described components are linked together as follows. A first isolation contactor contact IK1-1 is linked in series with a second isolation contactor contact IK2-1 and fuse 95 between voltage line L1 and node 60. Similarly, fuse 96 and contacts IK1-2 and IK2-2 are linked in series between line L2 and node 62 while fuse 97 and contacts IK1-3 and IK2-3 are linked in series between line L3 and node 64. Hereinafter, contacts IK1-1, IK1-2, IK1-3, IK2-1, IK2-2 and IK2-3 will be referred to generally and collectively as "line contacts."

Ground contacts G-1, G-2 and G-3 are linked between intermediate nodes 60, 62 and 64, respectively, and a grounding node 100. Grounding node 100 is linked via an equipment grounding conductor (EGC) to ground. Ground control coil GC is linked between ground node 100 and line L3.

Transformer 66 includes a primary winding linked between lines L1 and L2 and a secondary winding which is linked between a ground rail 68 and a voltage rail 70.

First isolation coil I-1 is linked in series with a plurality of contacts between rails 68 and 70. Specifically, coil I-1 is linked in series with NO control relay contact CR-1, first safety relay configuration contacts 1K1-1 and 1K2-1, second safety relay configuration contacts 2K1 and 2K2, and NC ground contact G-5. One intermediate node 102 exists between boxes 72 and 74, and another intermediate node 104 is provided between first intermediate coil I-1 and contact G-5. Coil I-2 is linked in series with contact IK1-4 and contacts 1K1-2 and 1K2-2 corresponding to the first safety relay configuration 76A between intermediate nodes 102 and 104. Thus, coil I-2, like coil I-1, is in series with a plurality of contacts between rails 68 and 70.

First safety relay configuration output contacts 1K1-3 and 1K2-3 form a parallel contact pair and the pair is in series with control relay coil CR between rails 68 and 70. Ground coil G is in series with contacts IK2-4, IK1-5 and CR-2 between rails 68 and 70.

Current limiting power supply 65 is linked to rails 68 and 70 and provides current limited rails to the controller components including a ground rail 110 and a voltage rail 112. An intermediate rail between rails 110 and 112 is identified by numeral 114.

Each of the remote lockout switches RLS1, RLS2 and RLS3 are similarly configured and operate in a similar manner and therefore only switch RLS1 will be explained here in detail. Switch RLS1 includes a pair of contacts 117 and 118 and another contact 116, pair 117 and 118 mutually exclusive with respect to contact 116 (i.e., when contact 116 is closed contact pair 117 and 118 is open and vice versa). Each contact 116, 117 and 118 forms an open circuit and includes a closing member 120, 121, 122, respectively, for closing the corresponding open circuit. As illustrated, member 120 closes its corresponding circuit while members 121 and 122 open their corresponding circuits. Switch RLS1 is capable of two mutually exclusive states, including an ON state and an OFF state. Switch RLS1 is illustrated in the OFF state wherein member 120 closes contact 116 and members 121 and 122 form open circuits at contacts 117 and 118. In the alternative, when switch RLS1 is ON, member 120 forms an open circuit at contact 116 while members 121 and 122 close contacts 117 and 118.

Switch RLS2 includes a contact pair 131 and 132 and another contact 130 while switch RLS3 includes contact pair 135 and 136 and another contact 134. Contacts 118, 132 and 136 are linked in series between first safety relay configuration 76A terminals which must be shorted in order for configuration 76A to close corresponding contacts in box 72. Similarly, contacts 117, 131 and 135 are linked in series between a second pair of first safety relay configuration terminals which also must be shorted in order for configuration 76A to close corresponding contacts in box 72. Thus, when each of contacts 117, 118, 131, 132, 135 and 136 are closed, if all of the first safety relay configuration contacts operate properly, each of the first safety relay configuration contacts (i.e., the contacts in box 72) close.

Each of RLSs RLS1, RLS2 and RLS3 is a lock-out/tag-out switch which, upon being opened can be locked out and tagged out in a conventional manner.

First contact 116 is linked in series with indicator 90 between rails 110 and 114. Similarly, contact 130 is linked in series with indicator 92 between rails 110 and 114 while contact 134 is linked in series with indicator 94 between rails 110 and 114. Contacts CR-3, GC-1 and G-4 are linked in series between rail 112 and intermediate rail 114.

Referring still to FIG. 2, preferably ground coil G is mechanically linked to isolation coils I-1 and I-2 such that ground coil G cannot alter the states of corresponding contacts (i.e., G-1, G-2, etc.) while either of coils I-1 or I-2 or both I-1 and I-2 are altering states of their corresponding contacts. In other words contactor G and contactors I-1 and I-2 are mutually exclusive.

Operation

Referring still to FIG. 2, in operation, with each of switches RLS1, RLS2 and RLS3 in their ON positions such that contacts 117, 118, 131, 132, 135 and 136 are closed and first contacts 116, 130 and 134 are open, when switches 78 and 80 are manipulated by an operator in an effort to provide power to hazard 52, all of the safety relay output contacts (i.e. contacts in boxes 72 and 74) are closed. In this case, control relay coil CR is energized such that control relay contact CR-1 is closed and contacts CR-2 and CR-3 are both open. Thus, all of the contacts in series with coils I-1 and I-2 are closed and each of coils I-1 and I-2 are energized. As current flows through coils I-1 and I-2, all of the line contacts (i.e., IK1-1, IK1-2, IK1-3, IK2-1, IK2-2 and IK2-3) close and power is provided to hazard 52 (i.e., referring also to FIG. 5, power is provided to VFD 428 and controls 430 to drive motor 421 and each of stations 402 through 420). In addition, isolation contacts IK2-4 and IK1-5 are both open when coils I-1 and I-2 are energized.

Moreover, because each of the contacts IK2-4, IK1-5 and CR-2 is open, ground coil G is not energized and therefore ground contacts G-1, G-2, G-3 and G-4 remain open while contact G-5 remains closed. If the EGC is actually grounded, voltage is applied across ground control coil GC and therefore contact GC-1 is closed.

Furthermore, because each of contacts CR-3 and G-4 is open and each of contacts 116, 130 and 134 is open, none of indicator lights 90, 92 and 94 are lit.

Next, it will be assumed that the process at the exemplary riveting station (i.e., 402 in FIG. 5) malfunctions during system operation. It will also be assumed that switch RLS1 and indicator light 90 are associated with station 402. To this end, switch RLS1 and light 90 are located proximate riveting station 402.

When the process malfunctions, an operator turns off the drive which controls the process. Prior to entering the station, the operator must first verify electrical isolation of that station (i.e., no power is being provided to any of the devices which together constitute the station). To verify electrical isolation of the station, the operator switches switch RLS1 from the ON position to the OFF position as illustrated in FIG. 2. When switch RLS1 is turned OFF, member 120 closes contact 116 while members 121 and 122 open contacts 117 and 118. When members 121 and 122 open contacts 117 and 118, first safety relay configuration 76A causes each of the output contacts in box 72 to open. When contacts 1K1-1, 1K1-2, 1K1-3, 1K2-1, 1K2-2 and 1K2-3 open, voltage is cut off from each of coils I-1, I-2 and CR.

When voltage is cut off from coils I-1 and I-2, ideally each of the line contacts IK1-1, IK1-2, IK1-3, IK2-1, IK2-2 and IK2-3 is opened thereby cutting off power to nodes 60, 62 and 64. In addition, when voltage is cut off from coils I-1, I-2 and CR, contacts IK2-4, IK1-5 and CR-2 all close (i.e., each of those contacts is a NC contact) and ground coil G is energized. When ground coil G is energized, contacts G-1, G-2, G-3 and G-4 all close and contact G-5 opens. When contact G-5 opens, an additional open circuit is provided in series with coils I1 and I2 to ensure power is cut off from nodes 60, 62 and 64. When contacts G-1, G-2 and G-3 are closed, each of intermediate nodes 60, 62 and 64 is linked to ground node 100. Thus, if ground node 100 is actually linked to ground, no power can be applied to nodes 60, 62 and 64.

Referring still to FIG. 2, when node 100 is actually grounded, voltage is still applied across ground control coil GC and therefore contact GC-1 remains closed. However, if node 100 should, for any reason (e.g., contact with an inadvertent power cable) be ungrounded, current is cut off from coil GC and contact GC-1 opens. Thus, after RLS1 is turned OFF, if all of the relays are working properly to ground nodes 60, 62 and 64 and if node 100 is actually grounded, each of contacts CR-3, GC-1 and G4 are closed. In addition, because member 120 is closed across contact 116, voltage is provided between rails 110 and 112 which illuminates indicator 90. Therefore, indicator 90 lights up indicating that it is safe for the operator to enter the station to service the malfunctioning process. Similar operation occurs when either of switches RLS2 or RLS3 are turned OFF. Prior to entering station 402 through an access point, switch RLS1 is locked out and tagged out to ensure safety. Illumination of light 90 verifies a locked out condition.

Industry accidents sometimes occur which could result in an inadvertent short circuit of the control wiring to the switches RLS1, RLS2 and RLS3 of safety relay circuit 76A. For example, crushing the wires could result in a short across contacts 118, 132 and 136. Nevertheless, series contacts 117, 131 and 135 provide a redundancy such that, even if contacts 118, 132 and 136 are shorted, configuration 76A will still operate to isolate hazard 52 and prevent the system isolation light from coming on when any one of switches 116, 130 or 134 is turned OFF and the resetting of the contactors is prevented.

It should be appreciated that while the configuration of FIG. 2 is a preferred embodiment which is advantageous because of its simple, relatively inexpensive and exceedingly robust design, the invention contemplates a relatively broad method which is independent of the hardware configuration used to facilitate the method. To this end, referring to FIG. 3, an exemplary method according to the present invention is illustrated. Although not illustrated, it is contemplated that a processor could perform the inventive method and, and in this regard, one embodiment of an exemplary processor is system 50 (see FIG. 2).

Figure 3:
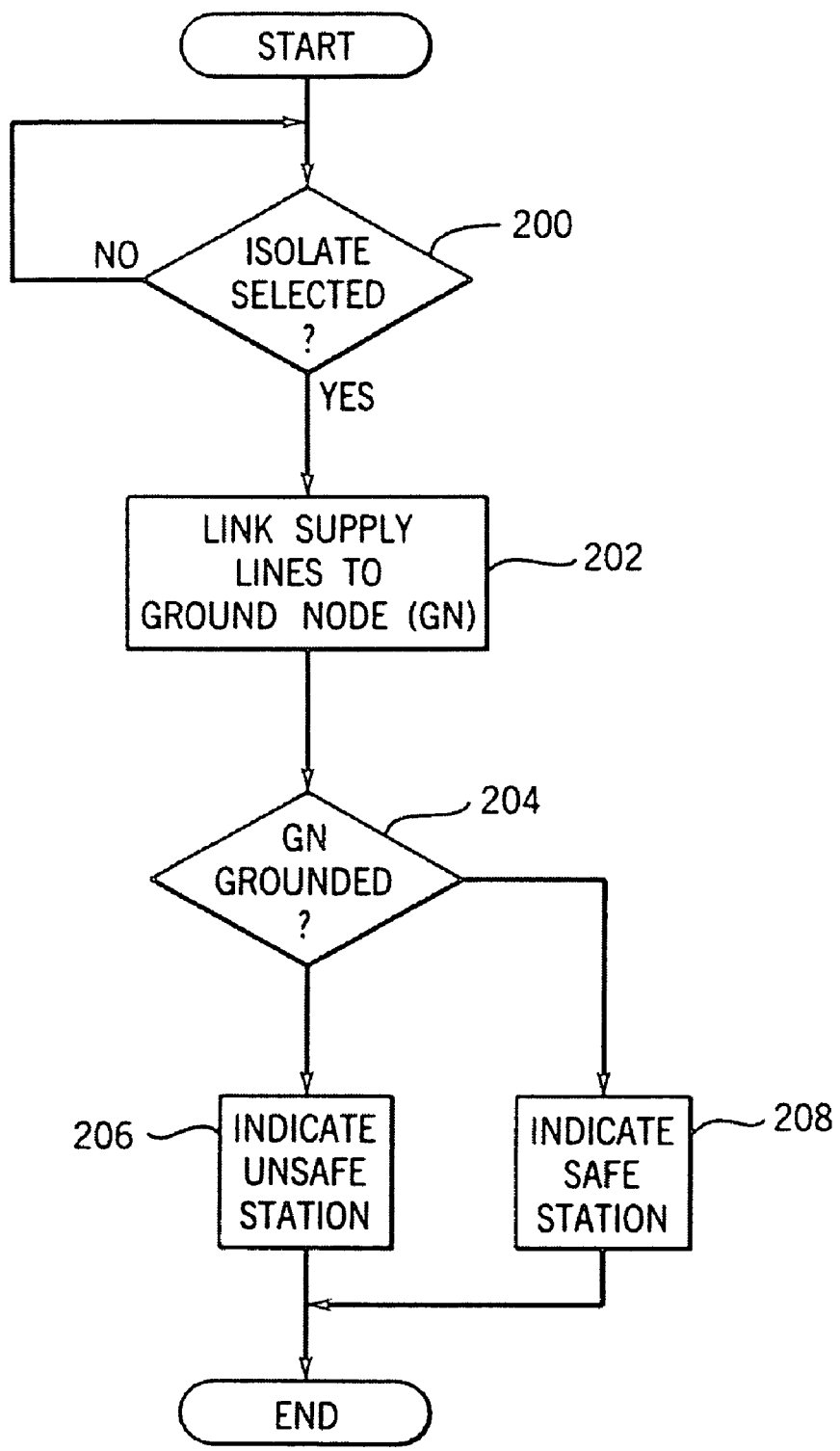
FIG. 3 is a flow chart illustrating a preferred method of operation of the grounding isolation system of FIG. 2.

Referring still to FIG. 3, at decision block 200 the processor determines if an operator has selected a station for electrical isolation. If the station has not been selected for isolation, the processor enters a monitoring loop until selection is identified. Where electrical isolation has been selected, at process block 202 the processor links the motion bus nodes 60, 62 and 64 (see FIG. 2 again) to ground node 100.

At decision block 204 the processor determines if ground node 100 is actually grounded (i.e., in FIG. 2 this is accomplished by coil GC and contact GC-1). If node 100 is not grounded, at block 206 the processor indicates an unsafe condition (e.g., will not light up a "system isolated" light). If node 100 is grounded, at block 208, the processor indicates a safe station (e.g., will light up a "system isolated" light).

Turning to FIG. 1, an improvement for implementation in systems for isolating and grounding a load, such as the isolation system 50 described above with respect to FIG. 2, is shown schematically in simplified form. As shown, the power lines L1, L2 and L3 are coupled to first, second and third terminals 12, 14 and 16, respectively, of a load device 10 by way of respective series-connected pairs of power contacts 20 and 22, 30 and 32, and 40 and 42. The respective terminals 12, 14 and 16 are further coupled to ground by way of grounding contacts 24, 34 and 44, respectively. Each of the contacts 20, 22, 24, 30, 32, 34, 40, 42 and 44 are NO contacts. Further, first, second and third sensing coils 26, 36 and 46 are respectively coupled between the first and second terminals 12, 14, the second and third terminals 14, 16, and the first and third terminals 12, 16, respectively.

The first, second and third sensing coils 26, 36 and 46 are respectively energized whenever the magnitudes of the respective voltages applied across the respective coils exceed respective thresholds. In one embodiment, for example, the first sensing coil 26 is energized and stays energized until the magnitude of the voltage differential between the first and second terminals 12, 14 declines below about 33% of the differential between lines L1 and L2. In this embodiment, therefore, assuming a normal RMS voltage differential of 480 volts AC between lines L1 and L2, the first sensing coil 26 remains energized until the voltage differential between terminals 12 and 14 falls to about 160 volts AC or less. Likewise, in such embodiment, the second and third coils 36, 46 remain energized so long as the magnitudes of the voltage differentials between the second and third terminals 14, 16 and the first and third terminals 12, 16, respectively, remain above about 33% of the normal voltage differentials between lines L2 and L3 and between lines L1 and L3 respectively. In other embodiments, the threshold voltage levels can vary from this embodiment. For example, in another embodiment, the sensing coils remain energized so long as the magnitudes of the voltage differentials across the coils are at or above about 20% of the normal voltage differential, or above about 96 volts AC.

Further as shown in FIG. 1, a control circuit 18 includes first and second power coils 28 and 38, respectively. The first power coil 28, when energized, causes each of the contacts 20, 30 and 40 to become closed and, when deenergized, causes each of those contacts to become open. Likewise, the second power coil 38, when energized, causes each of the contacts 22, 32 and 42 to become closed and, when deenergized, causes each of those contacts to become open. Thus, lines L1, L2 and L3 are only coupled to the respective terminals 12, 14 and 16 of the load device 10 when both of the first and second power coils 28, 38 are energized. Further as shown in FIG. 1, the control circuit 18 further includes a grounding coil 48 that, when energized, causes each of the grounding contacts 24, 34 and 44 to close and, when deenergized, causes each of those contacts to open. Thus, the terminals 12, 14 and 16 are only grounded when the grounding coil 48 is energized.

The control circuit 18 is designed to allow both the isolation of the load device 10 from the power lines L1, L2 and L3 and also the grounding of the load device, yet operates to delay the grounding of the load device following its isolation from the power lines until such time as the actual voltages at the terminals 12, 14 and 16 have reached levels that are close enough to zero so as to avoid deleterious effects on the load device that might otherwise occur due to the sudden grounding of the load device. The control circuit 18 provides this delay by way of the sensing coils 26, 36 and 46, which respectively control NC contacts 25, 35, and 45 that are coupled in series with the grounding coil 48. Isolation of the load device 10 from the power lines L1, L2 and L3 occurs upon the throwing of a switch 11 having first and second contacts 13, 15. The first contact 13 is coupled in series with the first power coil 28 between a power source 19 and ground, while the second contact 15 is coupled in series with the second power coil 38 between the power source and ground. The throwing of the switch 11 from its on state to its off state causes the contacts 13, 15 to open, which deenergizes each of the power coils 28, 38 and consequently opens each of the power contacts 20, 22, 30, 32, 40, and 42.

Deenergization of the first and second power coils 28 and 38, respectively, causes the closing of NC contacts 29 and 39, respectively, which are coupled in series with the grounding coil 48 and the NC contacts 25, 35 and 45, all of which are coupled in series between the power source 19 and ground. Thus, upon the throwing of the switch 11 from its on state to its off state, the only components of the control circuit 18 that prevent the immediate energization of the grounding coil 48 and consequent closing of the grounding contacts 24, 34 and 44 to ground the load device 10 are the NC contacts 25, 35 and 45. The closing of these NC contacts 25, 35 and 45, however, only occurs when all of the respective first, second and third sensing coils 26, 36 and 46 have become deenergized. Thus, the load device 10 only becomes grounded when each of the sensing coils 26, 36 and 46 has determined that the respective voltage differential being applied across it is below its respect predetermined threshold.

As shown in FIG. 1, the control circuit 18 includes certain additional elements. In particular, the switch 11 includes an additional contact 17, which is coupled in series with a NO contact 19, two NC contacts 27 and 37, and an indication lamp 33, between the power source 19 and ground. The contact 17 is mechanically coupled to the other contacts 13 and 15 of the switch 11 such that, when the first and second contacts 13 and 15 are opened, the contact 17 is closed and vice versa. The contact 19 is closed when the grounding coil 48 is energized, while the first and second contacts 27 and 37 are respectively closed when the respective first and second power coils 28 and 38 become deenergized. Consequently, when the switch 11 is thrown to the off state such that the power coils 28 and 38 become deenergized, and further the grounding coil 48 becomes energized due to the deenergizing of the first, second and third sensing coils 26, 36 and 46, the indicator lamp 33 turns on and thereby provides an indication that the load device 10 has been both isolated and grounded such that it is safe for an operator to work on the load device. Also shown in FIG. 1, two grounding contacts 49 are respectively coupled in series with each of the first and second power coils 28 and 38. The grounding contacts 49 provide redundancy such that, whenever the grounding coil 48 is energized, neither of the power coils 28 and 38 can be energized. Further as shown, each of the coils 28, 38 and 48 are mechanically coupled to one another such that the coils 28 and 38 can only be energized when the coil 48 is deenergized and vice versa.

The system of FIG. 1 can be modified in numerous ways from that shown. For example, in certain embodiments, only one or two of the sensing coils are employed rather than each of the three sensing coils 26, 36 and 46. In such embodiments where fewer than three sensing coils are employed, the number of sensing contacts is similarly reduced from the three contacts 25, 35 and 45 shown in the control circuit 18. Also, in alternate embodiments, the sensing coils 26, 36 and 46 need not be directly coupled between pairs of the terminals 12, 14 and 16 of the load device 10 (in a delta-type configuration). For example, in one alternate embodiment, each of the sensing coils 26, 36 and 46 is coupled between a respective one of the terminals 12, 14 and 16 and ground or neutral (in a Y-type configuration).

Referring to FIG. 6, in an additional alternate embodiment, the coils 26, 36 and 46 can be implemented within rectifier circuits that in turn are coupled between the terminals 12, 14 and 16. For example, as shown in FIG. 6, the first sensing coil 26 is implemented within a first rectifier circuit 480 that is coupled between the terminals 12 and 14. The rectifier 480 includes first, second, third and fourth diodes (or other diode-type devices) 482, 484, 486 and 488. The first diode 482 is coupled between the first terminal 12 and a first port 490 of the coil 26, the second diode 484 is coupled between the second terminal 14 and the first port of the coil, the third diode 486 is coupled between the first terminal and a second port 492 of the coil, and the fourth diode 488 is coupled between the second terminal and the second port. The cathodes of the first and second diodes 482, 484 are coupled to the first port 490 of the coil 26, while the cathodes of the third and fourth diodes 486,488 are coupled respectively to the first and second terminals 12 and 14.

By implementing the coils 26, 36 and 46 within rectifier circuits such as circuit 480, the voltage thresholds at which the coils become deenergized are lower than when the coils are directly coupled between the terminals 12, 14 and 16. For example, while without the use of such rectifier circuits, the coils in one embodiment (in a delta-type embodiment) become deenergized at a voltage differential below about 33% of the normal voltage (e.g., below about 160 volts in the case of a normal voltage of 480 volts), with the use of such rectifier circuits, the coils become deenergized at a voltage differential that is below about 20% of the normal voltage (e.g., below about 96 volts). Further, if the rectifier circuits including the coils 26, 36 and 46 are respectively connected between the respective terminals 12, 14 and 16 and ground/neutral (in a Y-type embodiment) given the same voltage differentials between the terminals, the coils become deenergized at an even lesser voltage differential since the voltage differential between each of the terminals and ground is 277 volts ($\sqrt{3}*480$). Specifically, the deenergization occurs below about 20% of 277 volts or about 55 volts.

In further alternate embodiments, the sensing coils 26, 36 and 46 can be replaced with alternate sensing components. The control circuit 18 can also be significantly modified depending upon the embodiment. For example, the contacts 13 and 15 can be replaced with a single contact which is coupled in series with a single grounding contact 49 and the parallel combination of the first and second power coils 28, 38. Indeed, in an embodiment in which only one set of power contacts was used to couple the power lines L1, L2 and L3 to the terminals 12, 14 and 16 (e.g., where either contacts 20, 30 and 40 or contacts 22, 32 and 42, but not both, were used), only one of the two power coils 28, 38 would be employed and likewise one of the contacts 27, 37 and one of the contacts 29, 39 would be removed from the control circuit 18. The control circuit 18 could also be modified for implementation with respect to power systems other than three-phase systems.

Figure 4:
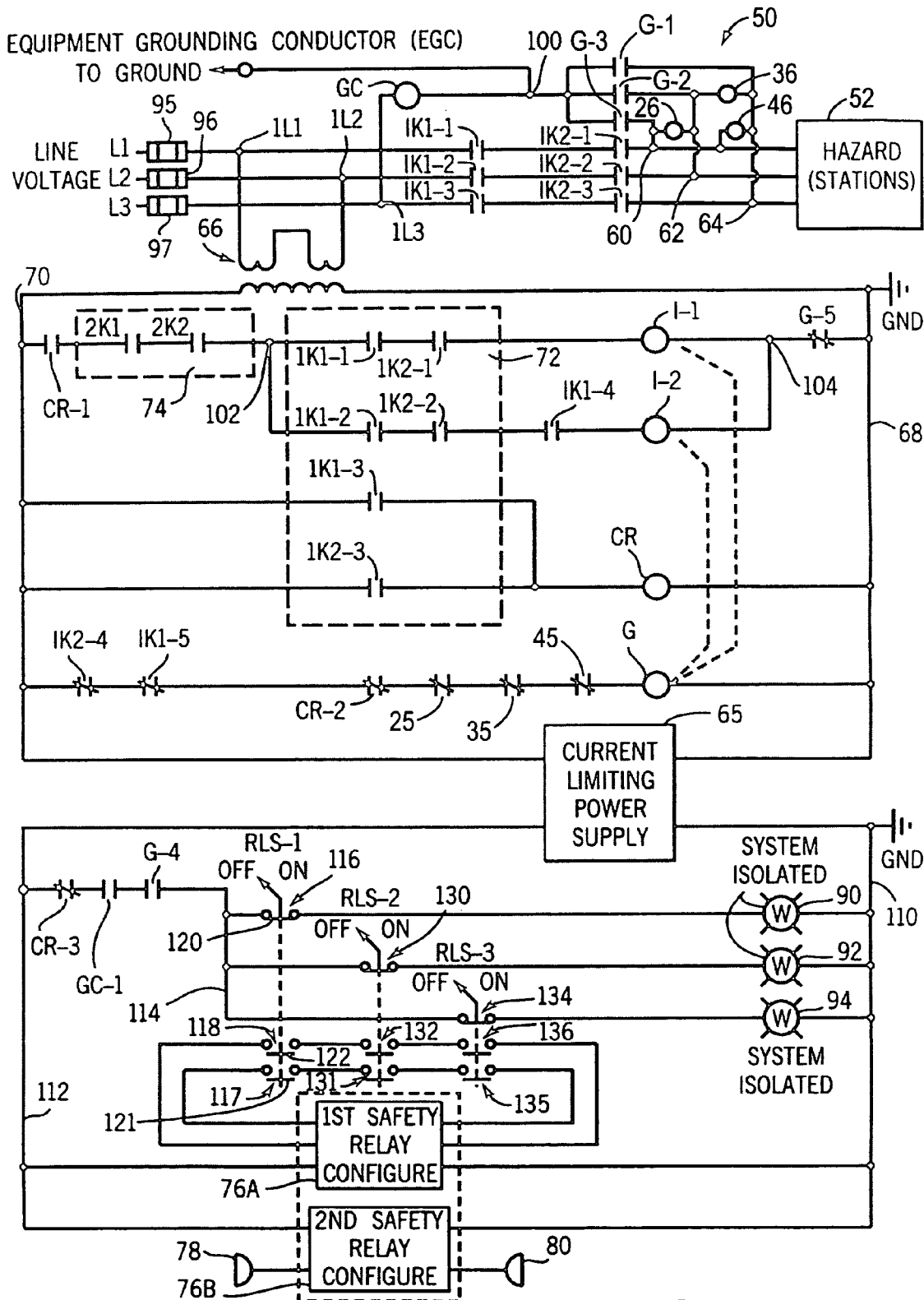
FIG. 4 is a schematic diagram illustrating a modified version of the grounding isolation system of FIG. 2, which incorporates a form of the present invention.

Turning to FIG. 4, another embodiment of the improvement discussed with respect to FIG. 1, in which grounding of the load device is delayed until the voltages at the terminals of the load device fall below predetermined thresholds, is shown to be implemented within the system of FIG. 2. In particular, FIG. 4 shows the first, second and third sensing coils 26, 36 and 46 to be respectively coupled between the terminals 60, 62 and 64 of the hazard 52. Also, the first, second and third NC contacts 25, 35 and 45 controlled by the respective coils 26, 36 and 46 are coupled in series with the ground coil G and the NC contacts IK2-4 and IK1-5. Given these additional components, the system of FIG. 4 exhibits the same advantages as the system of FIG. 1, namely, the energizing of the ground coil G and thus the coupling of the terminals 60, 62 and 64 to the ground node 100 are delayed until such time as each of the NC contacts 25, 35 and 45 are closed due to the deenergization of the respective first, second and third sensing coils 26, 36 and 46. This only occurs when the voltages at the terminals 60, 62 and 64 have reached acceptable levels. It should be noted that the NC contacts IK2-4 and IK1-5, which are respectively closed upon the deenergizing of the coils I-1 and I-2, respectively, serve the same purpose as the contacts 29, 39 of the control circuit 18 of FIG. 1. Also, the NC contact G-5 serves the same purpose as the contacts 49 in the control circuit 18, and the contacts 1K1-1, 1K2-1, 1K1-2 and 1K2-2 shown in the box 72 (controlled by the first safety relay configure 76A and thus by the switches RLS-1, RLS-2 and RLS-3) serve the same purpose as the contacts 13 and 15 of the control circuit 18.

It should be understood that the methods and apparatuses described above are only exemplary and do not limit the scope of the invention, and that various modifications could be made by those skilled in the art that would fall under the scope of the invention. For example, while the preferred method includes some mechanism for determining if a grounding node is actually grounded, the invention contemplates systems and methods which may not include this feature. In addition, the preferred system 50 (see FIG. 2) may be configured in many other ways. For instance, the safety relay output contacts may be differently configured to include fewer or more redundancies.

To apprize the public of the scope of the invention, the following claims are made:

What is claimed is:

1. A system for coupling a load to a ground, the system comprising: a first power contact that determines whether a first power line is coupled to a first terminal of the load;
    a first grounding contact that determines whether the first terminal of the load is coupled to the ground;
    a first sensing device coupled to the first terminal;
    and a control device in communication with the first power and grounding contacts and the first sensing device;
    wherein, upon a first signal being provided to the control device, the control device causes the first power contact to decouple the first terminal from the first power line isolating the load from the first power line;
    and wherein, upon the first sensing device determining that a first condition selected to indicate that grounding of the load will not damage the load has been met with respect to at least the first terminal, the control device causes the first grounding contact to couple the first terminal with the ground.

2. The system of claim 1, wherein the first sensing device includes a first sensing coil.

3. The system of claim 2, wherein each of the first power contact and the first grounding contact are normally open.

4. The system of claim 3, wherein the control device includes: a first switch;
    a first power coil that controls the first power contact so that, when the first power coil is energized, the first power contact is closed;
    a second grounding contact that is normally closed and is coupled in series with the first switch and the first power coil between a power source and the ground;
    a first grounding coil that controls the first and second grounding contacts so that, when the first grounding coil is energized, the first grounding contact is closed and the second grounding contact is opened;
    a first sensing contact that is normally closed and is controlled by the first sensing coil and wherein, when the first condition is not met, the first sensing coil is energized and the first sensing contact is opened;
    a second power contact that is normally closed and is coupled in series with the first sensing contact and the first grounding coil between the power source and the ground, wherein the second power contact is also controlled by the first power coil so that, when the first power coil is energized, the second power contact is opened.

5. The system of claim 4, wherein the first signal is provided to the control device when the first switch changes from being closed to being open;
    wherein the opening of the first switch causes the first power coil to turn off, which in turn causes the first power contact to decouple the first terminal from the first power line and further causes the second power contact to close;
    and wherein upon sensing that the first condition has been met, the first sensing coil is turned off so that the first sensing contact closes and the first grounding coil is energized, which in turn causes the first grounding contact to couple the first terminal to the ground.

6. The system of claim 5, further comprising a second switch coupled in series with the second power contact, the first grounding coil and the first sensing contact between the power source and the ground, wherein the second switch is mechanically coupled to the first switch so that, upon the first switch being opened, the second switch closes, and vice-versa.

7. The system of claim 4, further comprising: a third power contact that is normally open and determines whether a second power line is coupled to a second terminal of the load, wherein the third power contact is closed when the first power coil is energized;
    and a third grounding contact that is normally open and determines whether the second terminal of the load is coupled to the ground, wherein the third grounding contact is closed when the first grounding coil is energized.

8. The system of claim 7, wherein the first sensing coil is coupled between the first and second terminals of the load, and further comprising: a second sensing coil comprised within the first sensing device and coupled between the second terminal and a third terminal of the load, and a second sensing contact that is normally closed, is controlled by the second sensing coil, and is coupled in series with the first sensing contact, the second power contact, and the first grounding coil between the power source and the ground, wherein the first condition is determined to have been met when both the first and second coils turn off, which respectively cause the first and second sensing contacts to close, so that the first grounding coil is turned on and consequently the first and third grounding contacts are closed.

9. The system of claim 4, further comprising: a third power contact coupled in series with the first power contact between the first power line and the first terminal, wherein the control device further includes a second switch;
    a second power coil that controls the third power contact so that, when the second power coil is energized, the third power contact is closed;
    a third grounding contact that is normally closed and is coupled in series with the second switch and the second power coil between the power source and the ground;
    a fourth power contact that is normally closed and is coupled in series with the first sensing contact, the second power contact, and the first grounding coil;
    wherein the second switch is mechanically coupled to the first switch so that the first and second switches open and close.

10. The system of claim 9, wherein upon the opening of the first and second switches, the first and second power coils are turned off, which in turn causes the first, second, third, and fourth power contacts to be opened;
    wherein upon sensing that the first condition has been met, the first sensing coil is turned off so that the first sensing contact closes and the first grounding coil is energized, which in turn causes the first grounding contact to couple the first terminal to the ground;

and wherein the first grounding coil is mechanically coupled to each of the first and second power coils.

11. The system of claim 10, wherein an indication of load isolation is provided when the first and second power coils are turned off and the first grounding coil is energized.

12. The system of claim 11, further comprising an additional grounding contact that is normally open, two additional power contacts that are normally closed, an indicator lamp and an additional switch, all of which are coupled between the power source and the ground, wherein the additional switch is coupled to the first and second switches and opens when the first and second switches are closed, and vice-versa;

and wherein the two additional power contacts are closed when the first and second power coils are respectively deenergized, and the additional grounding contact is closed when the grounding coil is energized, so that the indicator lamp turns on to provide the indication when the first and second power coils are turned off and the first grounding coil is energized.

13. The system of claim 2, wherein the first sensing coil is coupled between the first terminal and a second terminal of the load, and wherein the first condition is met when a voltage between the first and second terminals falls below a threshold voltage such that the first sensing coil turns off.

14. The system of claim 13, wherein the threshold voltage is approximately 33% of a voltage between the first and second power lines.

15. The system of claim 14, where a delay occurs between the decoupling of the power supply from the first terminal and the coupling of the first terminal to the ground due to the operation of the first sensing coil and the control unit.

16. The system of claim 1, wherein the first sensing device is a rectifier circuit including first, second, third and fourth diodes and a first coil, wherein the first and second diodes are coupled between the first terminal and first and second ports of the first coil, respectively, and the third and fourth diodes are coupled between an additional terminal and the first and second ports of the first coil, respectively.

17. A system for decoupling first, second, and third terminals of a load from first, second and third power lines and then coupling the first, second and third terminals to a ground, wherein the coupling of the first, second and third terminals to the ground is delayed until voltage levels at those terminals meet a predetermined condition, the system comprising: first, second and third power contacts coupling the first, second and third terminals of the load with the first, second and third power lines, respectively;

first, second and third grounding contacts coupling the first, second and third terminals of the load with the ground;

sensing means for sensing the predetermined condition;

control means for controlling the status of the power contacts and the grounding contacts, wherein the control means is coupled to the sensing means, the power contact and the grounding contacts;

wherein the control means causes the power contacts to decouple the first, second and third terminals of the load from the first, second and third power lines, respectively, in response to receiving a first signal at a first time;

and wherein the control means causes the grounding contacts to couple the first, second and third terminals of the load with the ground at a second time following the first time in response to the sensing means sensing the predetermined condition.

18. A method of controlling the decoupling of a power line from a load and coupling that load to a ground in order to isolate and ground the load, the method comprising:

receiving a command to decouple the load from the power line;

opening a first contact between the power line and the load so that the power line is decoupled from the load isolating the load from the first power line;

determining that a first condition selected to indicate that grounding of the load will not damage the load is met;

upon determining that the first condition has been met, closing a second contact between the load and the ground so as to ground the load;

deenergizing a first power coil in response to the command, wherein the deenergizing of the first power coil causes the opening of the first contact and also causes the closing of a third contact;

and closing a fourth contact upon determining that the first condition has been met, wherein the third and fourth contacts are coupled in series with a first grounding coil and a switch between a power source and the ground, and wherein the switch is closed upon receiving the command, so that the closing of the third and fourth contacts causes the first grounding coil to be energized, so that the second contact is closed.

19. The method of claim 18, wherein the first condition is met when a sensing coil coupled to the load is deenergized, which in turn causes the second contact to close.

* * * * *